Dec. 11, 1923.

J. C. AAGAARD

STOCK WATERING TROUGH

Filed Feb. 6, 1923

1,477,411

INVENTOR.
James C. Aagaard,
BY
Geo. P. Kimmel ATTORNEY.

Patented Dec. 11, 1923.

1,477,411

UNITED STATES PATENT OFFICE.

JAMES C. AAGAARD, OF ORD, NEBRASKA.

STOCK-WATERING TROUGH.

Application filed February 6, 1923. Serial No. 617,332.

*To all whom it may concern:*

Be it known that I, JAMES C. AAGAARD, a citizen of the United States, residing at Ord, in the county of Valley and State of Nebraska, have invented certain new and useful Improvements in Stock - Watering Troughs, of which the following is a specification.

This invention has reference to stock watering troughs and its object is to provide a device in which a mean level of water is established in outside drinking troughs from a main supply, so that the outside troughs may be maintained at a level convenient to the animals wishing to drink irrespective of the amount demanded by such animals.

In accordance with the invention, there is provided a level-governing device or container located in a larger or main container in which the level of water may be maintained at a greater height than the outside drinking trough and by means of a float or the like, the level of water in the outside trough may be maintained at a medium height convenient to the animals while the supply of water reaching the outside trough may be replenished from time to time as used to be automatically supplied from a larger reservoir which may be located within a building, while the smaller or individual troughs are within the reach of the animals.

There is supplied a main tank designed to receive a supply of water to a maximum depth and in this main tank at one end of one side thereof, is another tank on the exterior of which the water level may reach a considerable depth.

The second tank is designed to contain the main supply of water to be fed as needed to the watering troughs exterior to the main tank.

The invention will be best understood from a consideration of the following detailed description taken in connection with the accompanying drawings, forming part of this specification, with the understanding that the invention is not confined to any strict conformity to the showing of the drawings, but may be changed and modified so long as such changes and modifications mark no material departure from the salient features of the invention as expressed in the appended claims.

In the drawings:—

Figure 1:
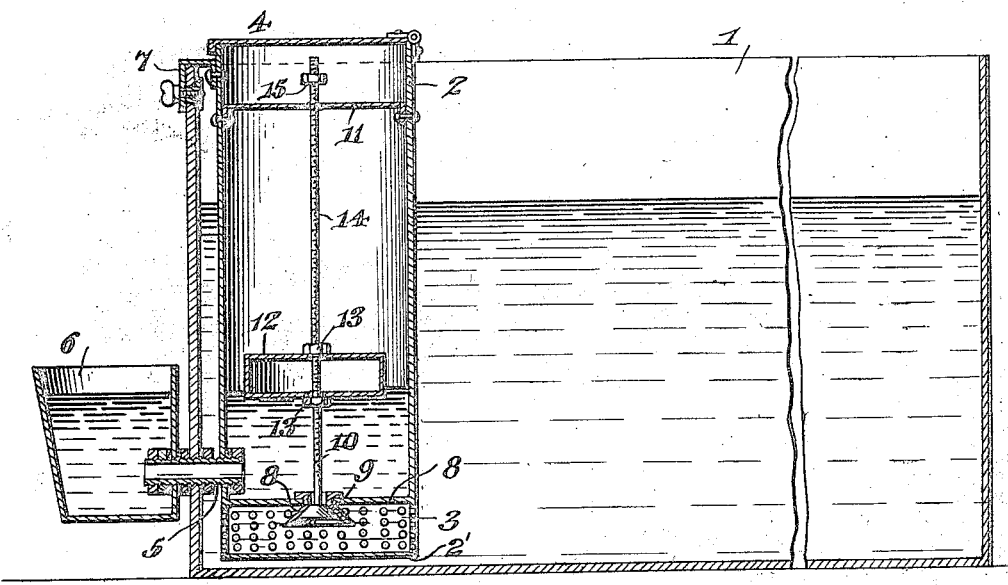
Figure 1 is a vertical section showing the disposition of the tank.
Figure 2:
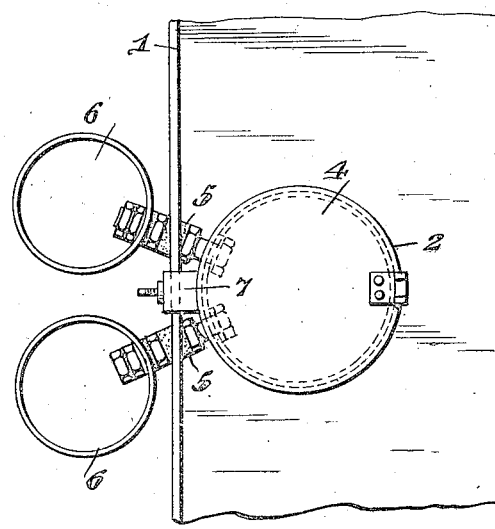
Fig. 2 is a plan view of the structure shown in Fig. 1 and including a pair of individual tanks, but not necessarily confined to such particular number.

Referring in particular to the drawings, there is shown a main supply tank 1, which may be located within a building, or covered in, so as to be protected against the effects of weather.

Within the tank 1, either near one end or one side thereof, is a supplemental receptacle 2, designed to contain a much less depth of water than the tank 1. The receptacle 2 is provided with a perforated bottom portion and with a hinged cover 4, which latter for convenience of access may extend above the tank 1 to protect the contents of the tank provided at its bottom with a chamber 2' having perforations 3 in its side walls. This cover 4 while closing the receptacle from foreign matter, does not fit tight enough to make the receptacle air-tight.

Leading from the receptacle 2 through one side thereof and also through the adjacent side of the tank 1, are fittings 5 extending beyond the tank 1 and entering individual drinking troughs 6, the fittings 5 being so arranged as to constitute supports for the trough 6 and also leading from the interior of the receptacle 2 to the interior of the trough 6, the construction being such that the junction between the fittings 5 and the receptacle 2 and trough 6 are water-tight. Besides the fittings 5, the receptacle 2 or reservoir 2 is supported by a bracket 7 serving as an additional support for the receptacle 2.

The fittings 5 provide uninterrupted connections for the passage of water between the supplemental receptacle 2 and the watering troughs 6 which latter are open at the upper end to permit access of animals to the interiors thereof.

Within the receptacle 2 near the bottom thereof, below the fittings 5, is a diaphragm 8 carrying a valve seat 8', centrally thereof and secured to the diaphragm 8.

Seated in the valve seat 8' is a valve head 9, carrying a stem 10, which rises upwardly through the receptacle 2 and in proximity to the top thereof, the stem 10 extends through a guide 11 above which the cover 4 is located. On the stem 10, which is screw threaded for the purpose, there is secured a float 12, held between spaced jamb nuts 13, while the upper end of the rod 14 carrying the float 12 and the nuts 13, has another nut 15, with the stem 14 passing through the diaphragm 11 to limit the downward movement of the rod 14.

When the instrumentalities constituting the watering trough structure are installed and the water is turned into the tank 1 to a depth greater than the water level in the drinking troughs 6, the water from the tank 1 flows through the perforations 3 in the side walls of the chamber 2 into the bottom of the receptacle 2 filling up the receptacle 2 to a level permitted by the level of the float 12.

Raising of the float 12 is arrested by the valve 9 with the valve seat 8', this raising the nut 15 and cutting off the flow of water from the tank 1 to the drinking trough 6, so that the flow of water from the main tank 1 to the auxiliary receptacle 2 is then arrested, keeping the drinking trough 6 with the determined level of water therein to be replenished from time to time by the opening of the valve 9.

What is claimed is:—

1. In a stock waterer, the combination with a supply tank, of a vertically positioned closed cylindrical receptacle supported therein at one end thereof and provided with a diaphragm in proximity to its bottom to form a water inlet chamber, the wall of said chamber being perforated throughout, a valve seat carried by said diaphragm and extending into said chamber, a valve head positioned against said seat for controlling the passage of water from said chamber and having a screw-threaded stem extending upwardly centrally of said receptacle, an adjustable float member carried by said stem, guide means for the upper end of said stem, positioned below the upper end of the receptacle, a screw threaded tubular member passing through the side wall of said tank, and communicating and connecting at its inner end with the said receptacle, and a drinking trough at the outer end of and communicating with said tubular member.

2. In a stock waterer, the combination with a tank, a receptacle arranged therein and adapted to communicate therewith, a vertically reciprocating valve member within said receptacle for controlling the supply of water from the tank to the receptacle, a screw threaded stem extending upwardly from said valve member, an adjustable float member surrounding said stem, spaced threaded retaining members carried by the screw threaded stem, one on either side of said float member for retaining the same in any desired position, a supporting diaphragm positioned below the upper end of the receptacle, through which the valve stem extends and a threaded retaining member carried by the valve stem above the supporting diaphragm to limit the downward movement of said stem, said receptacle having a discharge outlet.

In testimony whereof, I affix my signature hereto.

JAMES C. AAGAARD.